(No Model.)

J. L. SOMMER.
SHOE BUTTONER.

No. 294,284. Patented Feb. 26, 1884.

WITNESSES:
Howard M. Holbrook
Herman G. Loew

INVENTOR:
John L. Sommer
By H. Newell
his Attorney

United States Patent Office.

JOHN L. SOMMER, OF NEWARK, NEW JERSEY.

SHOE-BUTTONER.

SPECIFICATION forming part of Letters Patent No. 294,284, dated February 26, 1884.

Application filed December 6, 1883. (No model.)

*To all whom it may concern:*

Be it known that I, JOHN L. SOMMER, a citizen of the United States, residing at Newark, in the county of Essex and State of New Jersey, have invented certain new and useful Improvements in Shoe-Buttoners, of which the following is a specification.

My invention relates to certain improvements in implements for buttoning shoes; and it consists, first, in providing the handle of the buttoner with a recess to receive the buttons and fasteners; and, second, in combining with the handle a piercing-blade for cutting the holes for the insertion of the buttons.

Figure 1:
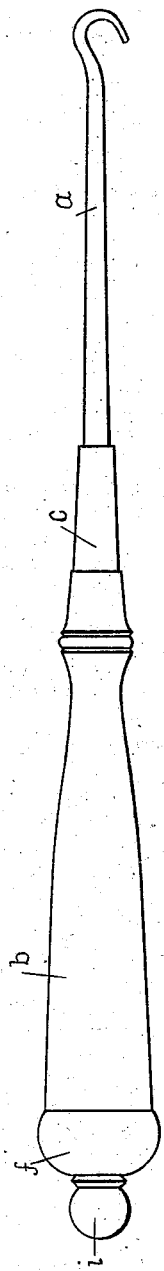
Figure 2:
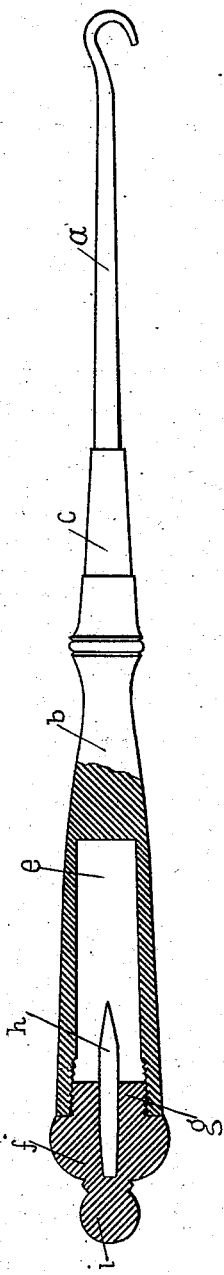

In the accompanying drawings, which serve to illustrate my invention, Figure 1 is a side elevation of a shoe-buttoner containing my improvements; and Fig. 2 is a similar view of the hook end, but with the handle portion in section.

My improvement consists in a combination implement, which is not only serviceable as a button-hook for fastening the buttons of shoes, but also forms a receptacle or case for containing loose buttons and their attachments for general use on shoes. With other advantages it also combines a means for piercing the material to permit of the insertion of the buttons.

In the drawings, $a$ represents in general a button-hook of the usual form, of which $b$ is the handle. The shank $a$, with its hook end, which is composed of metal, is secured in the handle $b$ by means of the tapering ferrule $c$. The body of the handle is hollowed out longitudinally to form a receptacle, $e$, for containing a number of loose shoe-buttons and their fastening-hooks or other securing devices.

$f$ is a cap which closes the open end of the handle, and is provided with an exterior screw-threaded neck, $g$, that engages a corresponding screw-thread formed in the recess $e$ of the handle.

Within the neck $g$ of the cap is secured, in any suitable manner, a pointed blade or barb, $h$, which, when the screw-cap is in place, is inclosed in the receptacle in the handle. This blade serves as a piercer for making the hole in the shoe to receive the eye of the button.

On the extremity of the cap $f$ is provided a ball-shaped knob, $i$, to facilitate the handling of the cap when using the piercer.

As the handle of the button-hook is made a receptacle for the buttons which are used upon the shoe and of the devices for securing the buttons in place, it is only necessary to unscrew the cap to have a button at hand to substitute for one found missing on the shoe; and in case an aperture is required to be made to receive the eye of the button the piercer is at once available for use.

What I claim as my invention, and desire to secure by Letters Patent, is—

The article shown and described, consisting of a button-hook having a recessed handle, and provided with a removable cap for closing its end, with a piercer or cutting-blade secured to said cap and inclosed within the handle, as and for the purpose set forth.

JOHN L. SOMMER.

Witnesses:
HERMAN G. LOEW,
JAMES A. BROWN.